US011965972B2

(12) United States Patent
Stanek et al.

(10) Patent No.: US 11,965,972 B2
(45) Date of Patent: Apr. 23, 2024

(54) SYSTEMS AND METHODS FOR DETERMINING A VEHICLE LOCATION IN A MANUFACTURING ENVIRONMENT

(71) Applicant: Ford Global Technologies, LLC, Dearborn, MI (US)

(72) Inventors: Joseph Stanek, Northville, MI (US); Allen R. Murray, Lake Orion, MI (US); Fahad Liaqat, Novi, MI (US); Sikder Imam, Novi, MI (US); Daniel Robert Taylor, Grosse Ile, MI (US); Charles Robert Maxwell Zine, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 17/573,739

(22) Filed: Jan. 12, 2022

(65) Prior Publication Data

US 2023/0221450 A1    Jul. 13, 2023

(51) Int. Cl.
G01S 19/48          (2010.01)
G01S 19/42          (2010.01)
G01S 5/00           (2006.01)

(52) U.S. Cl.
CPC .............. *G01S 19/48* (2013.01); *G01S 19/42* (2013.01); *G01S 19/485* (2020.05); *G01S 5/01* (2020.05); *G01S 5/017* (2020.05)

(58) Field of Classification Search
CPC ........ G01S 19/48; G01S 19/485; G01S 19/42; G01S 19/00; G01S 5/01; G01S 5/017; G01S 5/018; G01S 5/04; G01S 5/06

USPC ............ 342/357.31, 357.2, 357.25, 450, 353
See application file for complete search history.

(56) References Cited

U.S. PATENT DOCUMENTS

| | | | |
|---|---|---|---|
| 7,299,056 B2 * | 11/2007 | Anderson | G01S 19/49 |
| | | | 701/472 |
| 8,532,885 B1 | 9/2013 | Whitehead | |
| 10,176,718 B1 | 1/2019 | Mazuir et al. | |
| 10,762,409 B2 | 9/2020 | Swift | |
| 10,942,251 B2 * | 3/2021 | Kulkarni | G01S 5/04 |
| 11,628,831 B2 * | 4/2023 | Diamond | G05D 1/0248 |
| | | | 701/23 |
| 2017/0154386 A1 | 6/2017 | Hemmati et al. | |
| 2017/0361726 A1 * | 12/2017 | Widmer | G01S 19/45 |

(Continued)

FOREIGN PATENT DOCUMENTS

EP         3739356 A1 *  11/2020  ............. G01P 15/18

*Primary Examiner* — Chuong P Nguyen
(74) *Attorney, Agent, or Firm* — Burris Law, PLLC

(57) ABSTRACT

A method for determining a location of a vehicle includes a global navigation satellite system (GNSS) location system in a manufacturing environment. The method includes determining, when a key cycle transition condition of the vehicle and a vehicle gear transition condition of the vehicle are satisfied, a location parameter of the vehicle using an auxiliary location detection system, where the location parameter includes a location of the vehicle, identification information of the vehicle, and a timestamp of the vehicle. The method includes determining a vehicle time period based on the location parameter and a previous location parameter of the vehicle and validating a manufacturing routine of the vehicle when the location parameter satisfies a location condition and the vehicle time period satisfies a time condition.

20 Claims, 8 Drawing Sheets

(56) References Cited

U.S. PATENT DOCUMENTS

| | | |
|---|---|---|
| 2020/0158815 A1 | 5/2020 | Staats et al. |
| 2022/0073108 A1* | 3/2022 | Park .................. G01S 19/43 |
| 2023/0005177 A1* | 1/2023 | Stanek ................ G06V 20/56 |

* cited by examiner

SYSTEMS AND METHODS FOR DETERMINING A VEHICLE LOCATION IN A MANUFACTURING ENVIRONMENT

FIELD

The present disclosure relates to systems and methods for determining a vehicle location in a manufacturing environment.

BACKGROUND

The statements in this section merely provide background information related to the present disclosure and may not constitute prior art.

During a manufacturing process for a vehicle, the vehicle may be temporarily positioned at various locations in a manufacturing environment, such as an end-of-line (EOL) testing location. At the EOL testing location, the vehicle is tested to verify the functionality of, for example, powertrain components, vehicle network components, body components, and chassis components, among other vehicle components. The location of the vehicle may be tracked as it traverses between various bays/stations of the EOL testing location using, for example, location data from global navigation satellite system (GNSS) sensors. However, GNSS sensors may be inaccurate in a manufacturing environment and, more particularly, indoor manufacturing environments. These issues associated with GNSS sensors, among other issues, are addressed by the present disclosure.

SUMMARY

This section provides a general summary of the disclosure and is not a comprehensive disclosure of its full scope or all of its features.

The present disclosure provides a method for determining a location of a vehicle including a global navigation satellite system (GNSS) location system in a manufacturing environment. The method includes determining, when a key cycle transition condition of the vehicle and a vehicle gear transition condition of the vehicle are satisfied, a location parameter of the vehicle using an auxiliary location detection system, where the location parameter includes a location of the vehicle, identification information of the vehicle, and a timestamp of the vehicle. The method includes determining a vehicle time period based on the location parameter and a previous location parameter of the vehicle and validating a manufacturing routine of the vehicle when the location parameter satisfies a location condition and the vehicle time period satisfies a time condition.

In one form, the auxiliary location detection system includes a GNSS repeater system, an ultra-wideband (UWB) system, a triangulation system, a charging station location detection (CSLD) system, or a combination thereof. In one form, the auxiliary location detection system includes the GNSS repeater system, the GNSS repeater system includes one or more GNSS antennas disposed remotely from the vehicle and configured to receive GNSS signals, the GNSS repeater system includes one or more GNSS repeaters configured to broadcast one or more replicated GNSS signals based on the GNSS signals to the vehicle, and the location parameter is based on the one or more replicated GNSS signals. In one form, the auxiliary location detection system includes the UWB system, the UWB system includes a UWB transmitter disposed on the vehicle and one or more UWB receivers disposed remotely from the vehicle, the UWB transmitter is configured to broadcast UWB signals to the one or more UWB receivers, and the one or more UWB receivers are configured to determine a time-difference of arrival (TDOA) based on the UWB signals, and the location parameter is based on the TDOA of the one or more UWB receivers.

In one form, the auxiliary location detection system includes the triangulation system, the triangulation system includes a transmitter and a plurality of receivers, the transmitter is configured to broadcast wireless signals to the plurality of receivers, and the plurality of receivers are configured to triangulate the wireless signals to generate a triangulated signal, and the location parameter is based on the triangulated signal. In one form, the auxiliary location detection system includes the CSLD system, the CSLD system includes a plurality of coils, where each coil from among the plurality of coils is associated with predefined GNSS position coordinates, the plurality of coils are configured to output a charging signal when the vehicle is proximate the plurality of coils, and the location parameter is based on the charging signal.

In one form, the method further includes determining the key cycle transition condition of the vehicle is satisfied when the vehicle transitions between an on state and an off state within a threshold key cycle time. In one form, the threshold key cycle time is based on a predetermined elapsed time value after the vehicle transitions between a parked state and a non-parked state. In one form, the method further includes determining the vehicle gear transition condition of the vehicle is satisfied when the vehicle transitions between a parked state and a non-parked state within a threshold gear cycle time. In one form, the threshold gear cycle time is based on a predetermined elapsed time value after the vehicle transitions between an on state and an off state. In one form, the location condition is satisfied when the location parameter indicates the vehicle has moved from a first location to the location, and the time condition is satisfied when the vehicle time period indicates the difference between a first timestamp and the timestamp is less than a threshold value.

The present disclosure provides a method for determining a location of a vehicle including a global navigation satellite system (GNSS) location system and one or more image sensors in a manufacturing environment. The method includes determining an image-based location of the vehicle based on an image including a location tag, determining, using the GNSS location system, a GNSS-based location of the vehicle, and selectively activating an auxiliary location detection system based on a difference between the image-based location and the GNSS-based location, where the auxiliary location detection system includes a GNSS repeater system, an ultra-wideband (UWB) system, a triangulation system, a charging station location detection (CSLD) system, or a combination thereof. The method includes, in response to activating the auxiliary location detection system: determining, when a key cycle transition condition of the vehicle and a vehicle gear transition condition of the vehicle are satisfied, a location parameter of the vehicle using an auxiliary location detection system, where the location parameter includes a location of the vehicle, identification information of the vehicle, and a timestamp of the vehicle. The method includes determining a vehicle time period based on the location parameter and a previous location parameter of the vehicle and validating a manufacturing routine of the vehicle when the location parameter satisfies a location condition and the vehicle time period satisfies a time condition. In one form, the location tag is a fiducial marker including position indicia that identifies a predefined position coordinate of the location tag.

The present disclosure provides a system for determining a location of a vehicle including a global navigation satellite system (GNSS) location system and one or more image sensors in a manufacturing environment. The system includes a processor and a nontransitory computer-readable medium including instructions that are executable by the processor. The instructions include determining an image-based location of the vehicle based on an image including a location tag, determining, using the GNSS location system, a GNSS-based location of the vehicle, and selectively activating an auxiliary location detection system based on a difference between the image-based location and the GNSS-based location, where the auxiliary location detection system includes a GNSS repeater system, an ultra-wideband (UWB) system, a triangulation system, a charging station location detection (CSLD) system, or a combination thereof. The instructions include, in response to activating the auxiliary location detection system: determining, when a key cycle transition condition of the vehicle and a vehicle gear transition condition of the vehicle are satisfied, a location parameter of the vehicle using an auxiliary location detection system, where the location parameter includes a location of the vehicle, identification information of the vehicle, and a timestamp of the vehicle. The instructions include determining a vehicle time period based on the location parameter and a previous location parameter of the vehicle and validating a manufacturing routine of the vehicle when the location parameter satisfies a location condition and the vehicle time period satisfies a time condition.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
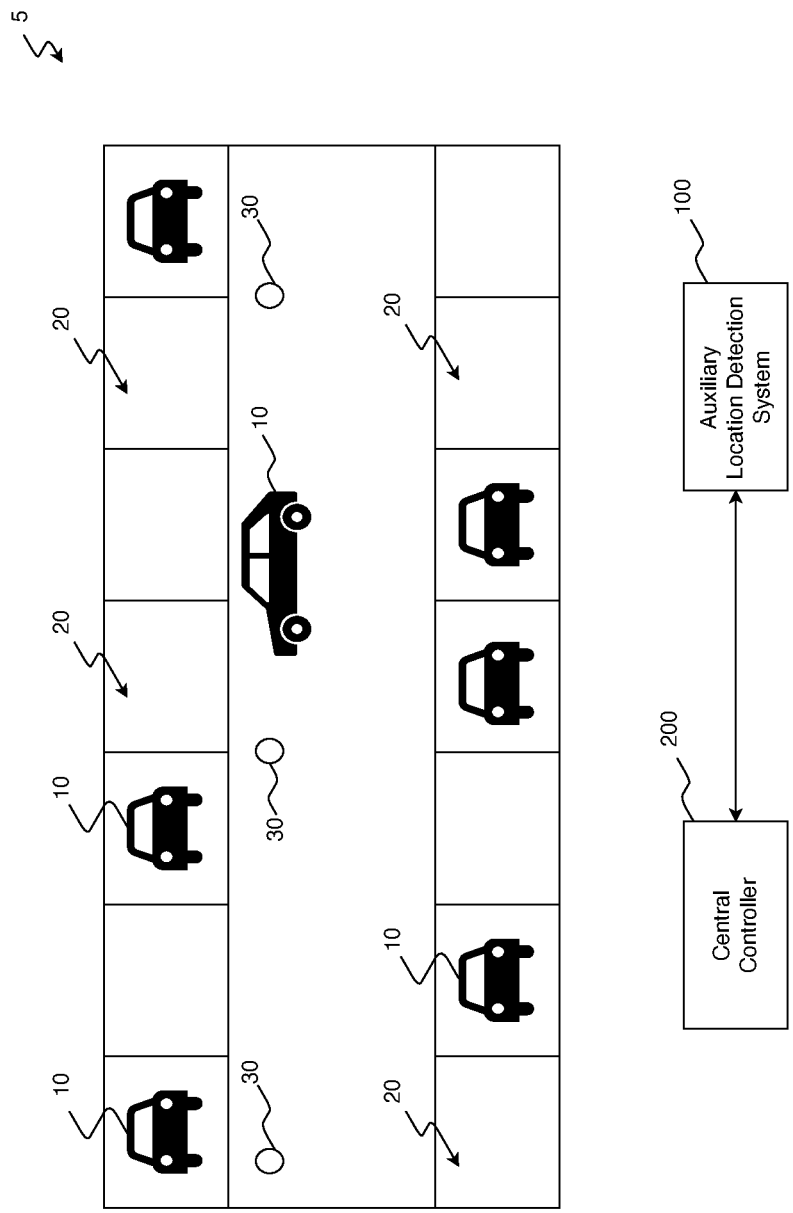
FIG. 1 illustrates a manufacturing environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for determining a location of a vehicle using an auxiliary location detection system when a global navigation satellite system (GNSS) of the vehicle 10 is inhibited due to obstructions within the manufacturing environment 5, the inherent error of the GNSS 12, among other factors. Furthermore, the systems and methods disclosed herein provide for accurate location parameter determinations when latency associated with broadcasting image data inhibits accurate and real-time image-based location determinations as the vehicle moves within the manufacturing environment. As an example, when various conditions of the vehicle are satisfied (e.g., a key cycle transition condition, a vehicle gear transition condition, among other vehicle conditions), the vehicle obtains an image-based location parameter and a GNSS-based location parameter to a central controller. The central controller determines whether the GNSS-based location is accurate based on a difference between the image-based and GNSS-based locations and activates the auxiliary location detection system if the difference between the image-based and GNSS-based locations is greater than a threshold value. Accordingly, the central controller can accurately determine the location of the vehicle in a manufacturing environment when the accuracy of the GNSS of the vehicle is inhibited.

Furthermore, the central controller may determine a vehicle time period based on a timestamp associated with multiple location parameters determined by one of the auxiliary location detection system and the GNSS and selectively validate a manufacturing routine (e.g., an EOL testing routine) based on the location parameter and the vehicle time period. For example, the central controller may validate that a given EOL testing routine is operating properly in response to the vehicle moving from a first location to a second location and the determined time vehicle time period between images captured at the first and second locations being less than a threshold value. As such, the central controller can track and monitor the vehicle as it traverses, for example, various EOL testing stations to verify that the respective EOL testing routines are sufficiently being performed.

Referring to FIG. 1, a manufacturing environment 5 is provided and generally includes vehicles 10, predefined areas 20, location tags 30, an auxiliary location detection system (ALDS) 100, and a central controller 200. While the ALDS 100 and the central controller 200 are illustrated as part of the manufacturing environment 5, it should be understood that the ALDS 100 and the central controller 200 may be positioned remotely from the manufacturing environment 5. Furthermore, while the ALDS 100 is shown as disposed remotely from the vehicles 10, it should be understood that one or more components of the ALDS 100 may be provided at the vehicles 10, as described below in further detail. In one form, the vehicles 10, the ALDS 100, and the central controller 200 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the predefined areas 20 may be any area within the manufacturing environment 5, such as a pre-production location, a production location, a post-production location, among others. As an example, the predefined areas 20 collectively form a parking lot that includes a plurality of parking spaces in which the vehicles 10 are stored, such as a vehicle repair station (e.g., an EOL testing station), a shipping station in which the vehicles 10 are loaded onto a transportation medium (e.g., a car carrier trailer), among other locations. While various examples of the predefined areas 20 of the manufacturing environment 5 are provided, it should be understood that the predefined areas 20 of the manufacturing environment 5 may be any area of the manufacturing environment 5.

In one form, the location tags 30 are fiducial markers that include position indicia (e.g., images, graphics, and/or text) that uniquely identifies a predefined position coordinate of a corresponding predefined area 20. As an example, the location tags 30 are AprilTags (i.e., 2D barcodes having 4-12 bits) and/or quick response (QR) tags that each include a unique 2D barcode, and each 2D barcode is associated with a predefined position coordinate, which may be a global navigation satellite system (GNSS) coordinate, an indoor positioning system-based coordinate/location, and/or other location identifiers. As another example, the location tags 30 may include text of the predefined position coordinates. It should be understood that the location tags 30 may be implemented by various others fiducial markers in other forms and are not limited to the examples described herein. In one form, the location tags 30 may be positioned within or adjacent to the predefined area 20 (e.g., a floor of the corresponding parking space, a fixed infrastructure element within/adjacent to the parking space, among others)

Figure 2:
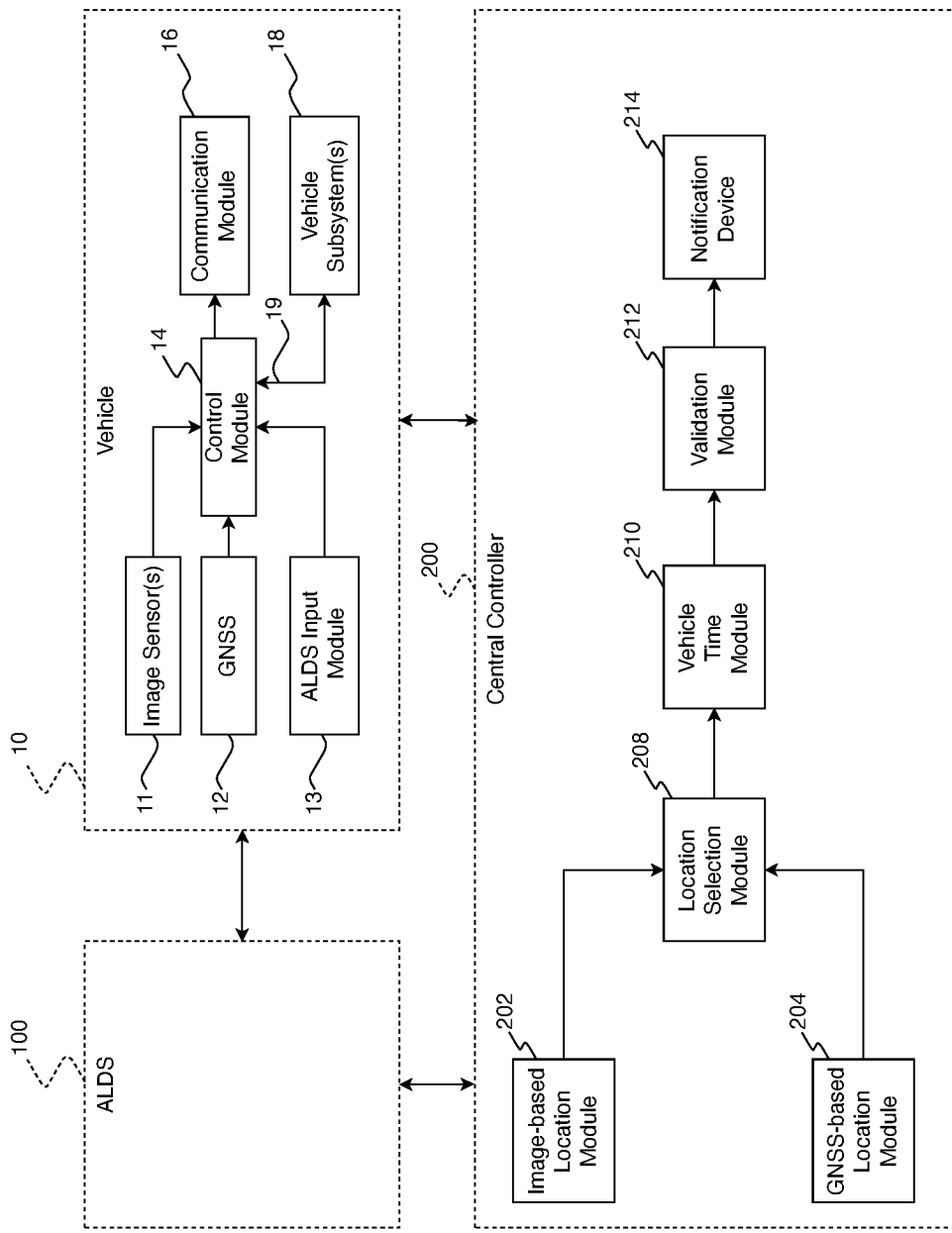
FIG. 2 illustrates a functional block diagram of a vehicle and a central controller in accordance with the teachings of the present disclosure.

Referring to FIGS. 1-2, the vehicle 10 includes image sensors 11, a global navigation satellite system (GNSS) 12, an ALDS input module 13, a control module 14, a communication module 16, and vehicle subsystems 18 communicably coupled by a vehicle communication network 19. In one form, the vehicle subsystems 18 include, but are not limited to: an ignition system, a transmission system, vehicle controllers, vehicle sensors, among other vehicle systems. In one form, the vehicle communication network 19 may include, but is not limited to: a controlled area network (CAN), a local interconnect network (LIN), and/or other suitable communication networks.

In one form, the image sensors 11 are configured to selectively obtain images of the manufacturing environment 5 and, more particularly, the location tags 30. The image sensors 11 may be disposed at any location of the vehicle 10, such as a rear, side, and/or front of the vehicle 10. The image sensors 11 may include, but are not limited to: a two-dimensional (2D) camera, a three-dimensional (3D) camera, an infrared sensor, a radar scanner, a laser scanner, among other imaging devices.

In one form, the GNSS 12 includes a GNSS sensor and a GNSS module configured to generate information representing the location of the vehicles 10. In one form, the ALDS input module 13 is configured to communicate with and receive location information from the ALDS 100. In one form, the ALDS input module 13 includes one or more transceivers, radio circuits, amplifiers, modulation circuits, processor circuits, memory circuits, among others, to communicate with the ALDS 100. Additional details regarding the ALDS 100 are provided below in further detail with reference to FIGS. 3-7.

The control module 14 is configured to control various functions of the vehicle 10. As an example, the control module 14 is configured to determine when a key cycle transition condition and a vehicle gear transition condition of the vehicle 10 are satisfied based on data generated by the one or more vehicle subsystems 18. In one form, when the key cycle transition condition and the vehicle gear transition condition of the vehicle 10 are satisfied, the control module 14 is configured to activate the image sensors 11 to obtain images of the location tags 30, generate location information using the GNSS 12, and/or obtain location information from the ALDS 100 via the ALDS input module 13. As an example, the key cycle transition condition is satisfied when the vehicle 10 transitions between an "ON" state and an "OFF" state within a threshold key cycle time, which is based on a predetermined elapsed time value after the vehicle 10 transitions between a parked state and a non-parked state. As another example, the vehicle gear transition condition is satisfied when the vehicle 10 transitions between the parked state and the non-parked state within a threshold gear cycle time, which is based on a predetermined elapsed time value after the vehicle 10 transitions between the "ON" state and the "OFF" state. Further details regarding the key cycle transition condition and the vehicle gear transition condition are provided below.

As used herein, the "ON" state refers to when the ignition system of the vehicle 10 is set, either manually or automatically, to one of an accessory mode position, the ignition position, and/or the start position. As used herein, the "OFF" state refers to when the ignition system of the vehicle 10 is not in the "ON" state, such as when the ignition system of the vehicle 10 is set, either manually or automatically, to an off-position/lock position. As used herein, the "parked state" refers to when vehicle 10 is not moving and when the transmission system of the vehicle 10 is set, either manually or automatically, to park. As used herein, the "non-parked state" refers to when the vehicle is not in the parked state (e.g., the vehicle 10 is moving and/or the vehicle 10 is set to drive, reverse, or neutral).

In one form, the communication module 16 is configured to broadcast image data obtained by the image sensors 11, the location information generated by the GNSS 12, and/or the location information obtained from the ALDS 100 to the central controller 200 when the key cycle transition condition and the vehicle gear transition condition are satisfied. Accordingly, the communication module 16 may include various components for performing the operations described herein, such as, but not limited to, transceivers, routers, and/or input/output interface hardware.

Figure 3:
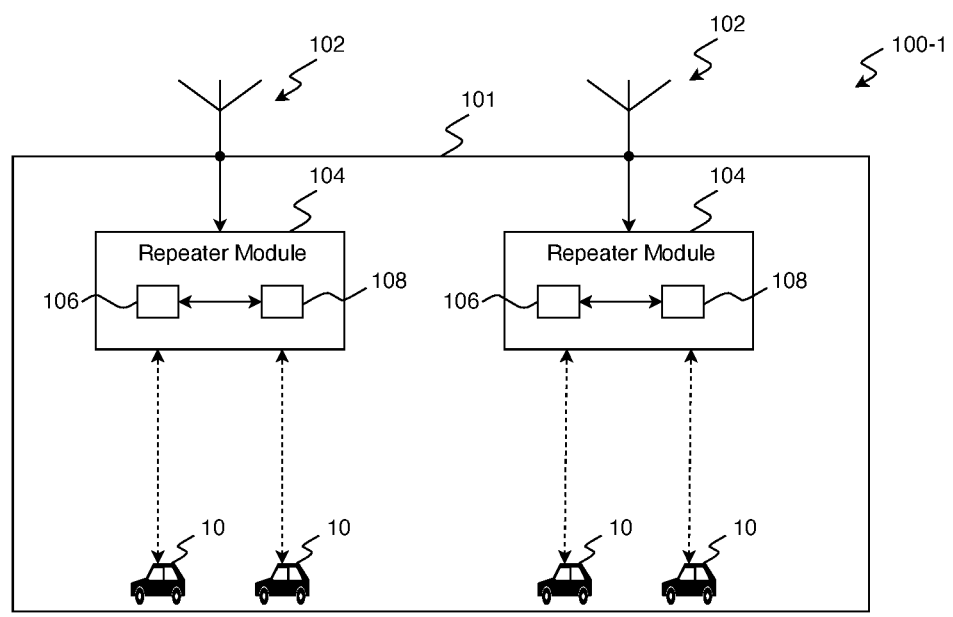
FIG. 3 illustrates an example auxiliary location detection system in accordance with the teachings of the present disclosure.

In one form, the ALDS 100 system is at least one of a GNSS repeater system, an ultra-wideband (UWB) system, a triangulation system, a charging station location detection (CSLD) system. As an example, and as shown in FIG. 3, GNSS repeater system 100-1 (as the ALDS 100) includes antennas 102 disposed on an exterior 101 of the manufacturing environment 5 (e.g., a roof of a building) and repeater modules 104. In one form, each repeater module 104 is associated with a set of the predefined areas 20. In one form, the repeater modules 104 include a replication module 106 configured to replicate GNSS signals obtained via the antennas 102 using known GNSS replication routines and broadcast the replicated GNSS signals to the vehicles 10 (shown by the dashed lines in FIG. 3). As such, the GNSS 12 of the vehicles 10 can determine the location parameter of the vehicle 10 based on the replicated GNSS signals broadcasted by the replication module 106, thereby improving the accuracy of the location parameter determination performed by the GNSS 12. Accordingly, the replication module 106 may include various components for performing the operations described herein, such as, but not limited to, transceivers, processor circuits, memory circuits, routers, and/or input/output interface hardware.

In one form, the repeater modules 104 include an optimization module 108 configured to optimize the replicated GNSS signals broadcasted by the replication module 106 such that the replicated GNSS signals do not interfere with replicated GNSS signals broadcasted by other repeater modules 104. As an example, the optimization module 108 may include waveguides, faraday cages, and/or other hardware for controlling the transmit power, azimuth, field of view, and/or phase angles such that the replication module 106 broadcasts the replicated GNSS signal to only the associated set of predefined areas 20.

Figure 4:
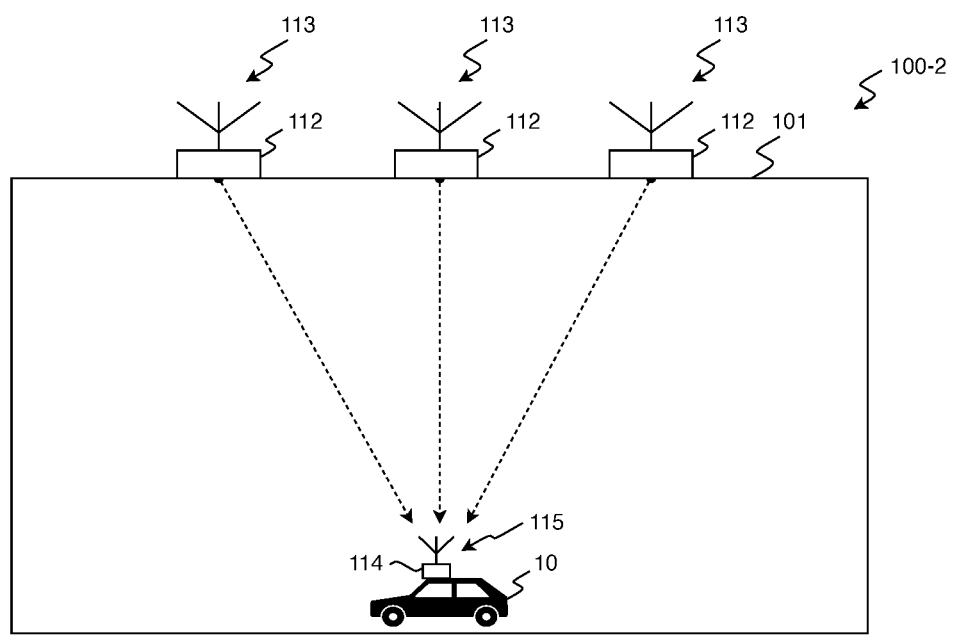
FIG. 4 illustrates another example auxiliary location detection system in accordance with the teachings of the present disclosure.

As another example and as shown in FIG. 4, triangulation system 100-2 (as the ALDS 100) includes base systems 112 disposed on the exterior 101 of the manufacturing environment 5 and a rover system 114 disposed on the vehicle 10. In one form, the rover system 114 is configured to broadcast cellular signals via a transmitter 115 to one or more receivers 113 of the base systems 112, and the base systems 112 collectively perform known triangulation routines to determine the location parameter of the vehicle 10. The base systems 112 may broadcast the triangulated signal to the rover system 114, which is configured to determine the location parameter of the vehicle 10 based on the triangulated signal. In one form, the GNSS 12 of the vehicle 10 obtains the triangulated signal from the base systems 112 via the rover system 114 and performs known real-time-kinematics (RTK) routines to determine the location parameter of the vehicle 10. Accordingly, the base systems 112 and the rover system 114 may include various components for performing the operations described herein, such as, but not limited to, transceivers, processor circuits, memory circuits, routers, and/or input/output interface hardware.

Figure 5:
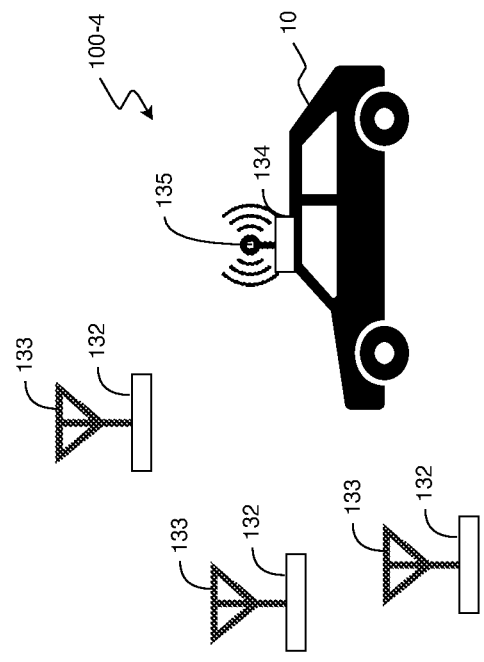
FIG. 5 illustrates an additional example auxiliary location detection system in accordance with the teachings of the present disclosure.

As an additional example and as shown in FIG. 5, triangulation system 100-3 (as the ALDS 100) includes base systems 122 disposed within the manufacturing environment 5 (e.g., the base systems 122 are disposed on one or more interior infrastructure elements of the manufacturing environment 5) and a rover system 124 disposed on the vehicle 10. In one form, the rover system 124 is configured to broadcast wireless signals (e.g., Bluetooth® signals, Wi-Fi signals, among other wireless signals) via a transmitter 125 to one or more receivers 123 of the base systems 122, and the base systems 122 collectively perform known triangulation routines to determine the location parameter of the vehicle 10. Accordingly, the base systems 122 and the rover system 124 may include various components for performing the operations described herein, such as, but not limited to, transceivers, processor circuits, memory circuits, routers, and/or input/output interface hardware.

Figure 6:
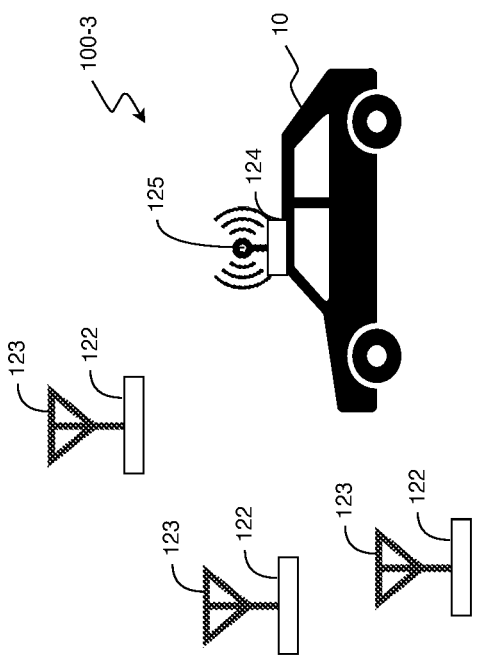
FIG. 6 illustrates an example auxiliary location detection system in accordance with the teachings of the present disclosure.

As yet another example and as shown in FIG. 6, UWB system 100-4 (as the ALDS 100) includes base systems 132 disposed within the manufacturing environment 5 (e.g., the base systems 132 are disposed on one or more interior infrastructure elements of the manufacturing environment 5) and a rover system 134 disposed on the vehicle 10. In one form, the rover system 134 is configured to broadcast UWB signals via a UWB transmitter 135 to one or more UWB receivers 133 of the base systems 132, and the base systems 132 are configured to determine a time-difference of arrival (TDOA) based on the received UWB signals. As such, the base systems 132 are configured to determine the location parameter of the vehicle 10 based on the TDOA and known positions of the UWB receivers 133. Accordingly, the base systems 132 and the rover system 134 may include various components for performing the operations described herein, such as, but not limited to, transceivers, processor circuits, memory circuits, routers, and/or input/output interface hardware.

Figure 7:
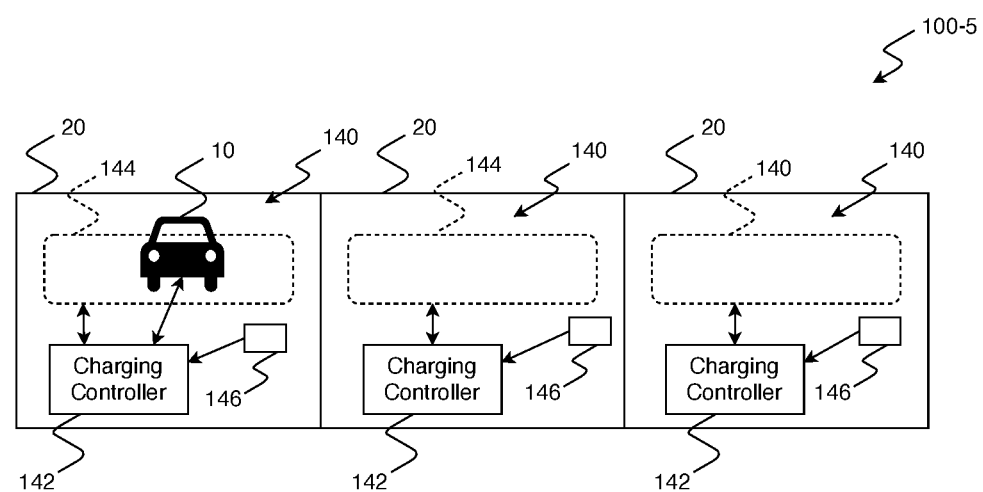
FIG. 7 illustrates an additional example auxiliary location detection system in accordance with the teachings of the present disclosure.

As a further example and as shown in FIG. 7, CSLD system 100-5 (as the ALDS 100) includes electric vehicle charging systems 140 disposed at each of the plurality of predefined areas 20. The electric vehicle charging systems 140 include a charging controller 142, a coil 144, and a scanner 146. While separate charging controllers 142 are shown for each predefined area 20, it should be understood that one charging controller 142 may be provided for each predefined area 20 or a plurality of predefined areas 20. In one form, the scanners 146 include radio frequency identification (RFID) scanners or other scanning devices configured to determine a vehicle identification number (VIN) of the vehicle 10 entering and exiting the predefined area 20 and a timestamp associated with the entry into/exit from the predefined area 20.

In one form, each of the coils 144 are associated with predefined GNSS position coordinates that are stored by the charging controller 142. In one form, the charging controllers 142 are configured to activate the coils 144 when the scanner 146 detects an entry of the vehicle 10 into the predefined area 20. In one form, when the vehicle 10 is proximate the coils 144 (i.e., the vehicle 10 is within the predefined area 20) and as a result of the magnetic field changes resulting from the vehicle 10 entering and exiting the predefined areas 20, the coils 144 are configured to output a charging signal to the charging controller 142. The charging signal may indicate a voltage of the coil 144, a signal output by an induction position sensor associated with the coil 144 (not shown), or a combination thereof. As such, the charging controller 142 may determine the position of the vehicle 10 within or relative to the coil 144 based on the charging signal. Furthermore, the charging controller 142 is configured to determine the GNSS coordinates of the vehicle 10 based on the GNSS position coordinates associated with the coil 144, the determined position of the vehicle 10 within or relative to the respective coil 144, and known distance-to-GNSS position routines. As such, the charging controller 142 is configured to determine the location parameter based on the GNSS coordinates of the vehicle 10 and the VIN/timestamp obtained from the scanner 146.

Referring to FIG. 2, in one form, the central controller 200 includes an image-based location module 202, a GNSS-based location module 204, an ALDS-based location module 206, a location selection module 208, a vehicle time module 210, a validation module 212, and a notification device 214. It should be readily understood that any one of the components of the central controller 200 can be provided at the same location or distributed at different locations (e.g., via one or more edge computing devices) and communicably coupled accordingly.

In one form, the image-based location module 202 is configured to determine the location parameter of the vehicle 10 when the key cycle and vehicle gear transition conditions are satisfied. As an example, the image-based location module 202 obtains a timestamp, vehicle identification information, and an image including the location tag 30 from the communication module 16. The image-based location module 202 then determines an image-based position of the vehicle 10 by decoding the position indicia of the location tag 30 using known digital image recognition techniques to identify the corresponding predefined GNSS coordinate of the location tag 30. Example systems for determining an image-based location of the vehicle 10 are described in U.S. patent application Ser. No. 17/364,136 titled "SYSTEMS AND METHODS FOR DETERMINING A VEHICLE LOCATION IN A MANUFACTURING ENVIRONMENT," which is commonly owned with the present application and the contents of which are incorporated herein by reference in its entirety. In one form, the GNSS-based location module 204 is configured to obtain the location parameter from the GNSS 12 of the vehicle 10 when the key cycle and vehicle gear transition conditions are satisfied.

In one form, the location selection module 208 is configured to selectively activate the ALDS 100 based on a difference between the image-based location parameter and the GNSS-based location parameter. As an example, when the key cycle and vehicle gear transition conditions are satisfied, the location selection module 208 determines a difference between the GNSS-based location and the image-based location. If the difference is greater than a threshold value, the location selection module 208 activates the ALDS 100, obtains the location parameter from the ALDS 100, and provides the location parameter to the vehicle time module 210. If the difference is less than the threshold value, the location selection module 208 does not activate the ALDS 100 and provides one of the GNSS-based location parameter and the image-based location parameter to the vehicle time module 210.

As such, the location selection module 208 provides for accurate location parameter determinations when the accuracy of the GNSS 12 of the vehicle 10 is inhibited due to obstructions within the manufacturing environment 5, the inherent error of the GNSS 12, among other factors. Furthermore, the location selection module 208 provides for accurate location parameter determinations when latency associated with broadcasting image data to the central controller 200 inhibits accurate and real-time location determinations as the vehicle 10 moves within the manufacturing environment 5. Additionally, selectively activating the ALDS 100 inhibits noise and signal interference when the GNSS 12 can accurately detect the location of the vehicle 10.

In some forms, when multiple ALDS 100 are provided within the manufacturing environment 5, the location selection module 208 may obtain the location parameter from one of the ALDS 100 based on one or more selection rules. As an example, the selection rules may indicate a priority of the ALDS 100 based on, for example, the hardware of the vehicle 10, the noise generated by wireless communication systems of the manufacturing environment 5, among other factors.

In one form, the vehicle time module 210 is configured to determine a vehicle time period based on the location parameter and a previous location parameter of the vehicle 10. As an example, the vehicle time module 210 determines the vehicle time period based on a difference between the timestamps of the location parameter and the previous location parameter.

In one form, the validation module 212 is configured to determine whether the location parameter satisfies a location condition and whether the vehicle time period satisfies a time condition. In one form, the location condition is satisfied when the location parameter indicates the vehicle 10 has moved from a first location to a second location, the vehicle 10 has moved to a predefined location, among others. It should be understood that the location condition may be satisfied based on other criteria associated with the location parameter and is not limited to the examples described herein. In one form, the validation module 212 determines the time condition is satisfied when the vehicle time period indicates that the difference between the timestamp (i.e., most recent timestamp) and a previous timestamp is less than a threshold value. It should be understood that the time condition may be satisfied based on other criteria associated with the vehicle time period and is not limited to the example described herein.

In response to the validation module 212 determining the location condition and the time condition are satisfied, the validation module 212 is configured to validate a manufacturing routine (e.g., an EOL testing routine, a production routine, an inspection routine, a vehicle diagnostic routine, among others) when the location parameter satisfies the location condition and the vehicle time period satisfies the time condition. As used herein, "validating the manufacturing routine" refers to determining that the manufacturing routine is being performed in accordance with acceptable and predefined tolerances, states, conditions, and/or values. As an example, validating the manufacturing routine may include determining that a production routine and/or inspection routine of the vehicle 10 is proper as a result of the vehicle 10 traversing the manufacturing environment 5 in accordance with predefined cycle times associated with the predefined areas 20. As another example, validating the manufacturing routine may include determining that a vehicle diagnostic routine and/or EOL routine of the vehicle 10 is properly completed as a result of the vehicle 10 traversing the manufacturing environment 5 in accordance with a given time period associated with performing the vehicle diagnostic/EOL routines at the predefined areas 20.

In one form, the notification device 214 is configured to output an alarm, an alert, and/or a notification based on the determination of the validation module 212. As an example, the notification device 214 (e.g., a visual display device, an audio device, a human machine interface (HMI), and/or a tactile feedback device) to output an alarm in response to the validation module 212 not validating the manufacturing routine, thereby enabling an operator to perform various corrective actions on the vehicle 10 and/or the manufacturing routine parameters. While the notification device 214 is shown as part of the central controller 200, it should be understood that the notification device 214 may be provided at the vehicle 10, the ALDS 100, or any other location within the manufacturing environment 5.

Figure 8:
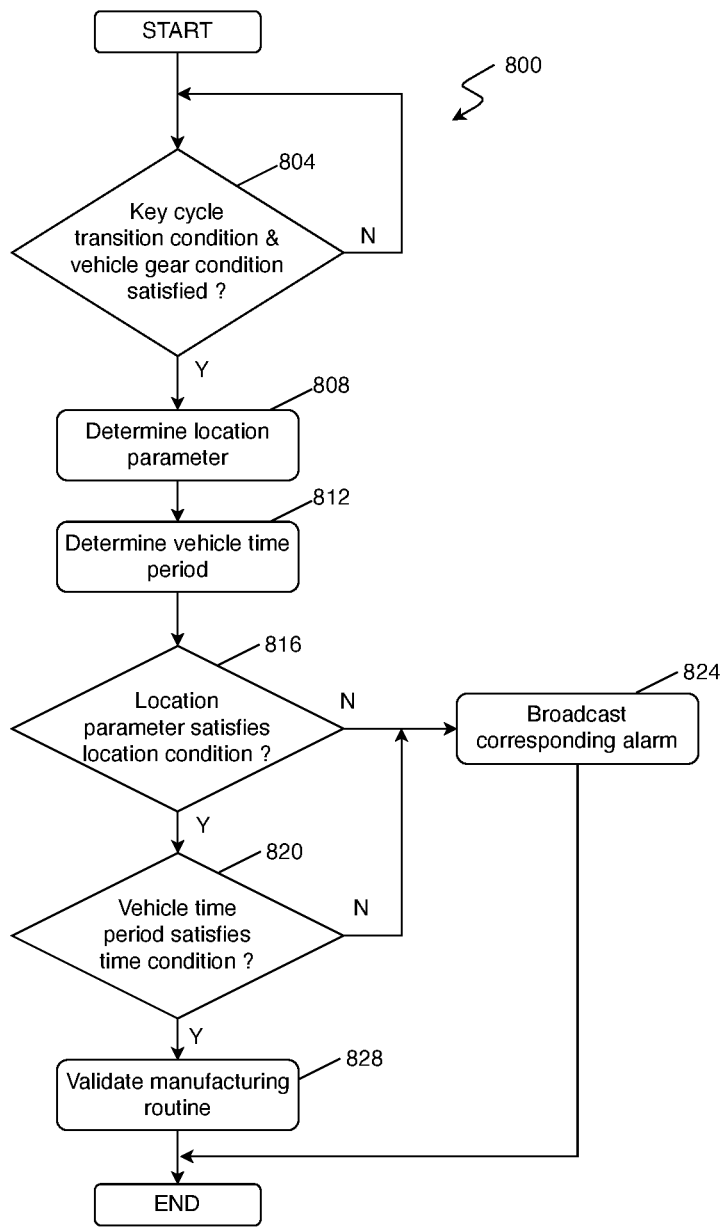
FIG. 8 is a flowchart of an example routine for validating a manufacturing routine in accordance with the teachings of the present disclosure.

Referring to FIG. 8, a routine 800 for determining a location of the vehicle 10 within the manufacturing environment 5 is provided. At 804, the vehicle 10, and more particularly, the control module 14, determines whether the key cycle transition condition and the vehicle gear transition condition are satisfied. If so, the routine 800 proceeds to 808. Otherwise, if the key cycle transition condition and the vehicle gear transition condition are not satisfied, the routine 800 remains at 804 until both the key cycle transition condition and the vehicle gear transition condition are satisfied. At 808, the central controller 200, the GNSS 12, or the ALDS 100 determines the location parameter. Additional details regarding step 808 are provided below with reference to FIG. 9.

At 812, the central controller 200 determines the vehicle time period based on the location parameter and a previous location parameter. At 816, the central controller 200 determines whether the location parameter satisfies the location condition. If so, the routine 800 proceeds to 820. If the location parameter does not satisfy the location condition at 816, the routine 800 proceeds to 824. At 820, the central controller 200 determines whether the vehicle time period satisfies the time condition. If so, the routine 800 proceeds to 828. If the vehicle time period does not satisfy the time condition at 820, the routine 800 proceeds to 824. At 824, the notification device 214 broadcasts an alarm based on the location parameter not satisfying location condition and/or the vehicle time period not satisfying the time condition. At 828, the central controller 200 validates a manufacturing routine associated with the vehicle 10 (e.g., a production routine, a vehicle diagnostics routine, among others).

Figure 9:
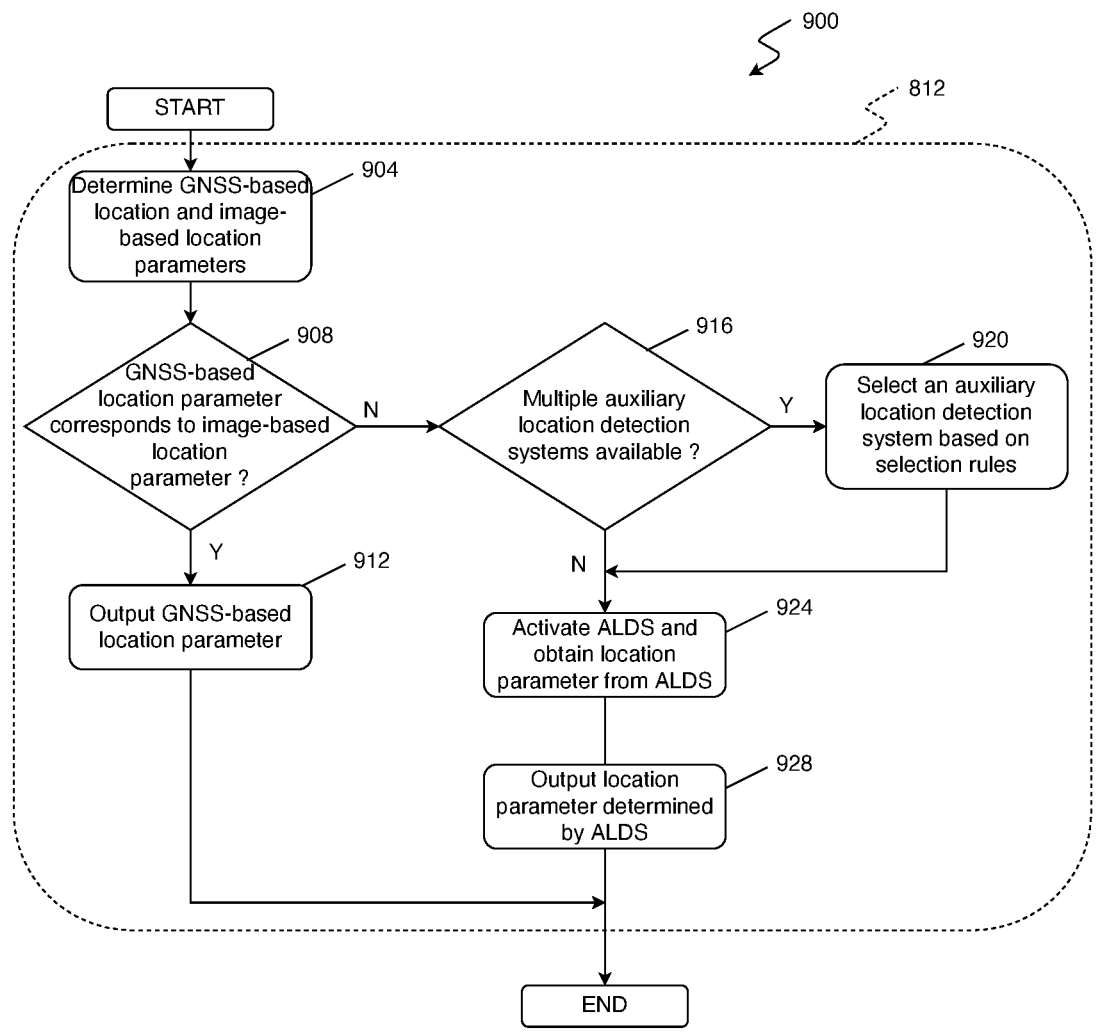
FIG. 9 is a flowchart of an example routine for determining a location parameter in accordance with the teachings of the present disclosure.

Referring to FIG. 9, a routine 900 for determining the location parameter at step 808 of FIG. 8 is shown. At 904, the GNSS 12 determines a GNSS-based location parameter of the vehicle 10, and the image-based location module 202 determines an image-based location parameter of the vehicle 10 based on the broadcasted image data. At 908, the location selection module 208 determines whether the GNSS-based location parameter corresponds to the image-based location parameter. As an example, the location selection module 208 determines the GNSS-based location parameter corresponds to the image-based location parameter when a difference between the GNSS-based location and the image-based location is less than a threshold value. If the GNSS-based location parameter corresponds to the image-based location parameter at 908, the routine 900 proceeds to 912, where the location selection module 208 outputs the GNSS-based location parameter. If the GNSS-based location parameter does not correspond to the image-based location parameter, the routine 900 proceeds to 916.

At 916, the location selection module 208 determines whether multiple ALDS 100 are available within the manufacturing environment 5. If so, the routine 900 proceeds to 920, where the location selection module 208 selects one of the ALDS 100 based on the selection rules and proceeds to 924. If one ALDS 100 is available at 916, the routine 900 proceeds to 924, where the location selection module 208 activates the ALDS 100 and obtains the location parameter from the selected ALDS 100. At 928, the location selection module 208 outputs the location parameter determined by the ALDS 100 to the vehicle time module 210.

It should be understood that routines 800, 900 are example routines and that the central controller 200, the vehicle 10, and the ALDS 100 may perform other routines in other forms.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for determining a location of a vehicle including a global navigation satellite system (GNSS) location system in a manufacturing environment, the method comprising:
   determining, when a key cycle transition condition of the vehicle and a vehicle gear transition condition of the vehicle are satisfied, a location parameter of the vehicle using an auxiliary location detection system, wherein the location parameter includes a location of the vehicle, identification information of the vehicle, and a timestamp of the vehicle;
   determining a vehicle time period based on the location parameter and a previous location parameter of the vehicle; and
   validating a manufacturing routine of the vehicle when the location parameter satisfies a location condition and the vehicle time period satisfies a time condition.

2. The method of claim 1, wherein the auxiliary location detection system includes a GNSS repeater system, an ultra-wideband (UWB) system, a triangulation system, a charging station location detection (CSLD) system, or a combination thereof.

3. The method of claim 2, wherein:
   the auxiliary location detection system includes the GNSS repeater system;
   the GNSS repeater system includes one or more GNSS antennas disposed remotely from the vehicle and configured to receive GNSS signals;

the GNSS repeater system includes one or more GNSS repeaters configured to broadcast one or more replicated GNSS signals based on the GNSS signals to the vehicle; and the location parameter is based on the one or more replicated GNSS signals.

4. The method of claim 2, wherein:

the auxiliary location detection system includes the UWB system;

the UWB system includes a UWB transmitter disposed on the vehicle and one or more UWB receivers disposed remotely from the vehicle;

the UWB transmitter is configured to broadcast UWB signals to the one or more UWB receivers, and the one or more UWB receivers are configured to determine a time-difference of arrival (TDOA) based on the UWB signals; and the location parameter is based on the TDOA of the one or more UWB receivers.

5. The method of claim 2, wherein:

the auxiliary location detection system includes the triangulation system;

the triangulation system includes a transmitter and a plurality of receivers;

the transmitter is configured to broadcast wireless signals to the plurality of receivers, and the plurality of receivers are configured to triangulate the wireless signals to generate a triangulated signal; and the location parameter is based on the triangulated signal.

6. The method of claim 2, wherein:

the auxiliary location detection system includes the CSLD system;

the CSLD system includes a plurality of coils, wherein each coil from among the plurality of coils is associated with predefined GNSS position coordinates;

the plurality of coils are configured to output a charging signal when the vehicle is proximate the plurality of coils; and the location parameter is based on the charging signal.

7. The method of claim 1 further comprising determining the key cycle transition condition of the vehicle is satisfied when the vehicle transitions between an ON-state and an OFF-state within a threshold key cycle time.

8. The method of claim 7, wherein the threshold key cycle time is based on a predetermined elapsed time value after the vehicle transitions between a parked state and a non-parked state.

9. The method of claim 1 further comprising determining the vehicle gear transition condition of the vehicle is satisfied when the vehicle transitions between a parked state and a non-parked state within a threshold gear cycle time.

10. The method of claim 9, wherein the threshold gear cycle time is based on a predetermined elapsed time value after the vehicle transitions between an on state and an off state.

11. The method of claim 1, wherein:

the location condition is satisfied when the location parameter indicates the vehicle has moved from a first location to the location; and the time condition is satisfied when the vehicle time period indicates the difference between a first timestamp and the timestamp is less than a threshold value.

12. A method for determining a location of a vehicle including a global navigation satellite system (GNSS) location system and one or more image sensors in a manufacturing environment, the method comprising:

determining an image-based location of the vehicle based on an image including a location tag;

determining, using the GNSS location system, a GNSS-based location of the vehicle; and selectively activating an auxiliary location detection system based on a difference between the image-based location and the GNSS-based location, wherein the auxiliary location detection system includes a GNSS repeater system, an ultra-wideband (UWB) system, a triangulation system, a charging station location detection (CSLD) system, or a combination thereof; and in response to activating the auxiliary location detection system:

determining, when a key cycle transition condition of the vehicle and a vehicle gear transition condition of the vehicle are satisfied, a location parameter of the vehicle using the auxiliary location detection system, wherein the location parameter includes a location of the vehicle, identification information of the vehicle, and a timestamp of the vehicle;

determining a vehicle time period based on the location parameter and a previous location parameter of the vehicle; and validating a manufacturing routine of the vehicle when the location parameter satisfies a location condition and the vehicle time period satisfies a time condition.

13. The method of claim 12 further comprising determining the key cycle transition condition of the vehicle is satisfied when the vehicle transitions between an ON-state and an OFF-state within a threshold key cycle time.

14. The method of claim 13, wherein the threshold key cycle time is based on a predetermined elapsed time value after the vehicle transitions between a parked state and a non-parked state.

15. The method of claim 12 further comprising determining the vehicle gear transition condition of the vehicle is satisfied when the vehicle transitions between a parked state and a non-parked state within a threshold gear cycle time.

16. The method of claim 15, wherein the threshold gear cycle time is based on a predetermined elapsed time value after the vehicle transitions between an on state and an off state.

17. The method of claim 12, wherein:

the location condition is satisfied when the location parameter indicates the vehicle has moved from a first location to the location; and the time condition is satisfied when the vehicle time period indicates the difference between a first timestamp and the timestamp is less than a threshold value.

18. The method of claim 12, wherein the location tag is a fiducial marker including position indicia that identifies a predefined position coordinate of the location tag.

19. A system for determining a location of a vehicle including a global navigation satellite system (GNSS) location system and one or more image sensors in a manufacturing environment, the system comprising:

a processor; and a nontransitory computer-readable medium including instructions that are executable by the processor, wherein the instructions include:

determining an image-based location of the vehicle based on an image including a location tag;

determining, using the GNSS location system, a GNSS-based location of the vehicle;

selectively activating an auxiliary location detection system based on a difference between the image-based location and the GNSS-based location, wherein the auxiliary location detection system includes a GNSS repeater system, an ultra-wideband (UWB) system, a triangulation system, a charging station location detection (CSLD) system, or a combination thereof; and in response to activating the auxiliary location detection system:
determining, when a key cycle transition condition of the vehicle and a vehicle gear transition condition of the vehicle are satisfied, a location parameter of the vehicle using the auxiliary location detection system, wherein the location parameter includes a location of the vehicle, identification information of the vehicle, and a timestamp of the vehicle;
determining a vehicle time period based on the location parameter and a previous location parameter of the vehicle; and
validating a manufacturing routine of the vehicle when the location parameter satisfies a location condition and the vehicle time period satisfies a time condition.

20. The system of claim 19, wherein the auxiliary location detection system includes a GNSS repeater system, an ultra-wideband (UWB) system, a triangulation system, a charging station location detection (CSLD) system, or a combination thereof.

* * * * *